March 31, 1936. F. AESCHBACH 2,036,112
MACHINE FOR MIXING, STIRRING, AND KNEADING DOUGH
Filed May 25, 1934 4 Sheets-Sheet 4
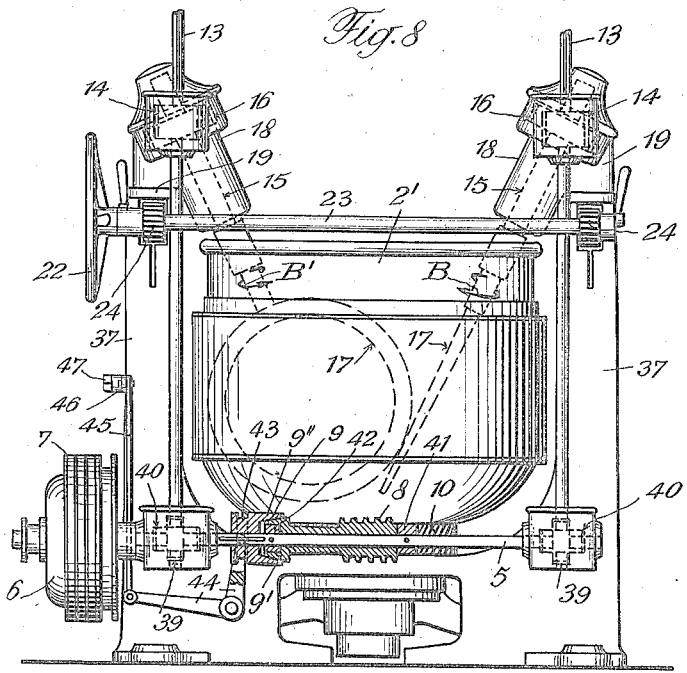
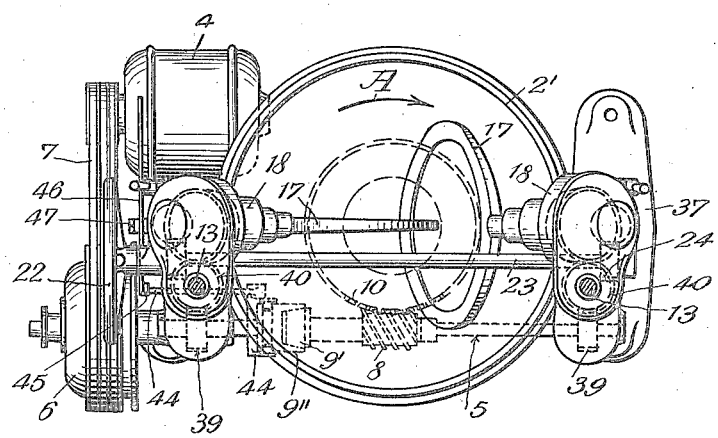
Inventor:
Friedrich Aeschbach,
By Sommers + Young
Attys.

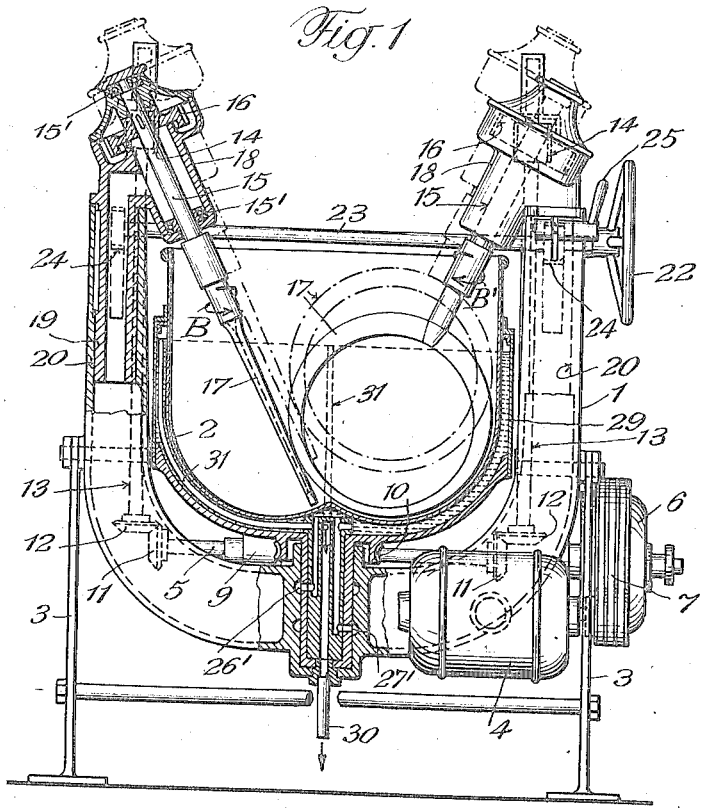
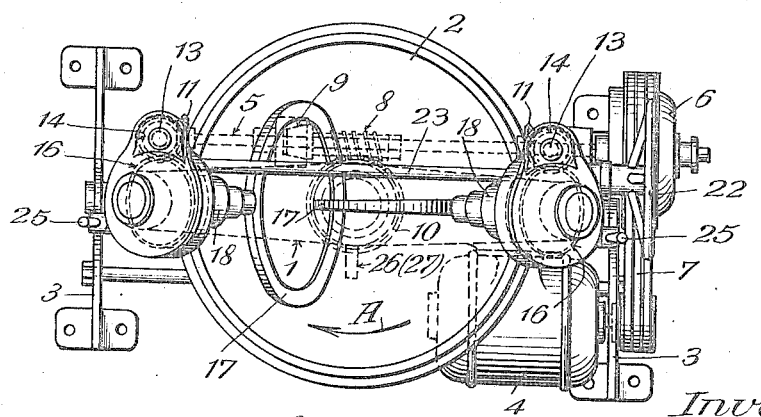

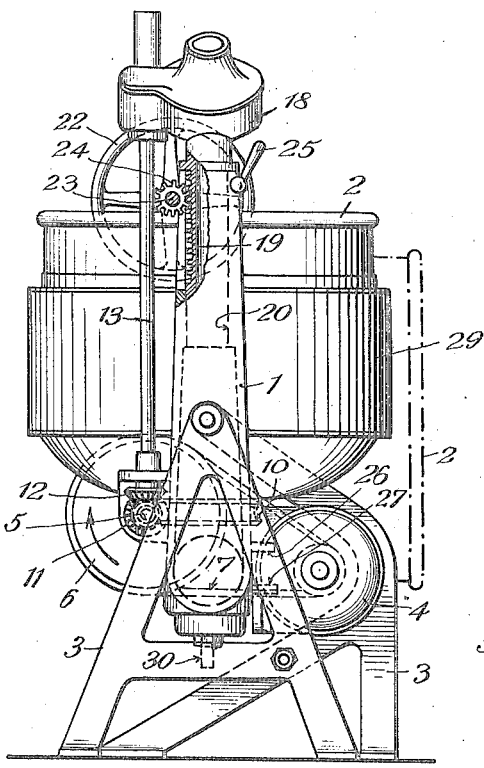
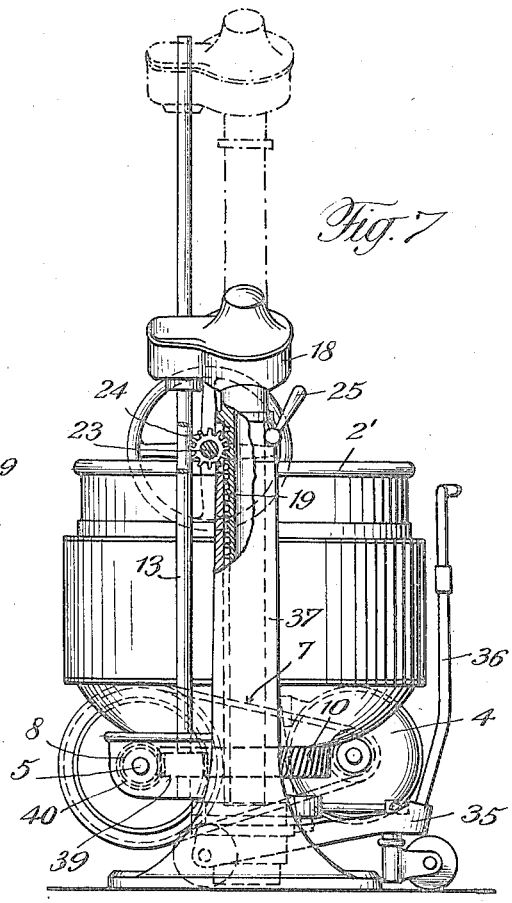
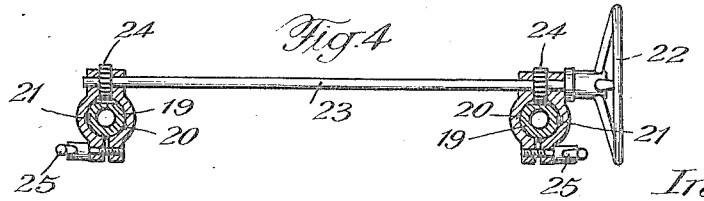

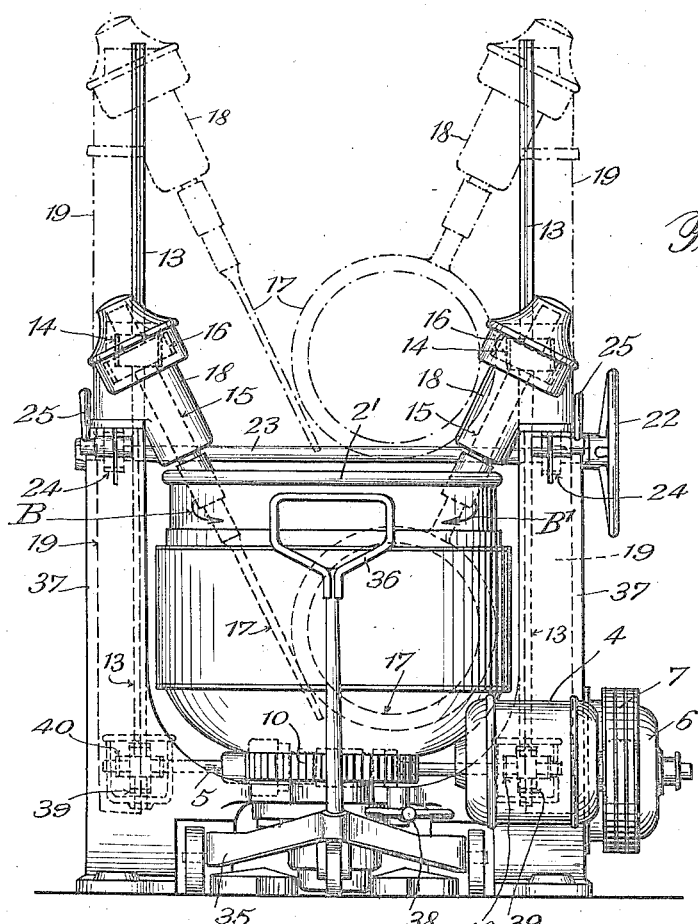
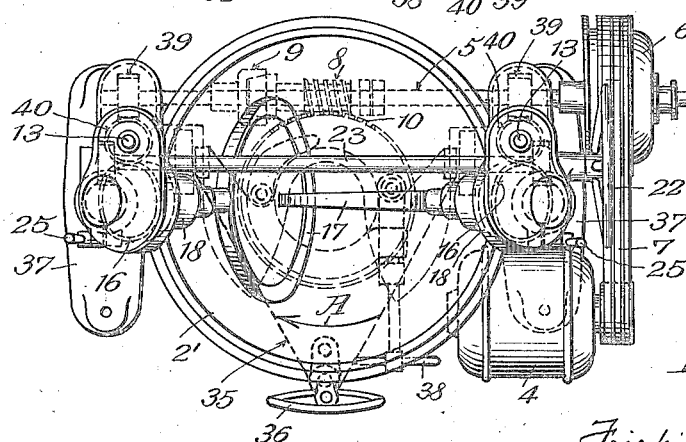

Patented Mar. 31, 1936

2,036,112

UNITED STATES PATENT OFFICE 2,036,112

MACHINE FOR MIXING, STIRRING, AND KNEADING DOUGH

Friedrich Aeschbach, Aarau, Switzerland

Application May 25, 1934, Serial No. 727,533
In Switzerland June 2, 1933

7 Claims. (Cl. 259—84)

This invention relates to machines for mixing, stirring and kneading dough.

To machines of this kind comprising dough working implements connected to operating shafts the drawback is inherent that the material begins to climb up on the shafts during the period of drawing out and kneading the dough following the period during which the dough formation is initiated in the material.

In order to avoid this drawback, resort has already been taken to the measure of securing to each of the operating shafts a stop disc for arresting the upward movement of the dough during the latter period. Such stop discs are, however, unsatisfactory in so far, as the dough having accumulated on the underside of the disc is no longer worked, as this part of the dough stays permanently outside the trough and is idly turned about together with the operating shaft, so that it remains improperly mixed and kneaded.

It is also known, to combine with a stop disc referred to above a scraper which wipes the raised material off the stop disc, for the purpose of readmitting it to the trough, by causing this material to drop down from the scraper. As the material wiped off by the scraper is not removed from the latter in positive manner, it often happens that this material sticks to the scraper also.

In the machine according to the present invention comprising a rotatable trough and two oppositely revolving dough working implements that are mounted in the machine frame and the bearing shafts of which are situated in a plane passed through the axis of the trough and converge in the direction towards the trough and the paths of rotational movement of which intersect in the axis of rotation of the trough, and each implement being so formed that it is adapted to contact with the inner wall of the trough at least once during a revolution of the same, the rising up of the dough on the implements is prevented by providing a lifting device for commonly adjusting the implements relatively to the trough which device is adapted to be locked in the respective position of adjustment with the machine frame, so that the distance by which the bottom of the trough and the implements are thus spaced apart suffices for keeping the dough down.

Thus, the operation of this machine actually involves a method of preventing particles of a confined circular mass of the material to be worked by rotating implements from climbing up on the working implements by seizing portions of the material on opposite sides of the circumference of the mass of said material and raising said seized portions towards the central zone of the mass to be intermingled thereat by approaching on one another along substantially horizontal arcuate paths that intersect at said zone, and then repeating this sequence of working operations successfully at different pairs of oppositely disposed circumferential points of variable angular dispositions relatively to said circular mass, the working implements being dipped deeper into the material during the period of initiating the dough formation in the material up to a required extent than during the period of drawing and kneading the dough.

In this way climbing up of the dough on the working implements is prevented in a much simpler, i. e. more rational and at the same time cleaner and more reliable manner than is possible by means of the hitherto known relevant measures by changing the conditions at which the dough is worked between the working implements on the one hand and the cooperating inner wall surface of the trough on the other hand by merely altering the relative disposition of the implements and the trough and thus altering the areal extent of the total working surface continuously engaging the material acted upon. By this means the attendance of the machine is considerably facilitated not only by permitting the operator to control the treatment of the amount of material contained in the trough at a time so that waste losses are avoided with the aid of an ordinary hand control means, but also to watch the progress of the treatment free of obstruction to the sight by cumbersome stop means present on the implements owing to absence of any special stop means on the implements.

Another feature of the invention consists in the provision of means for rendering inoperative the drive of the trough during the period in which the implements act on the material for finally working the same in a separated disposition from the bottom of the trough. To this end, in the drive of the trough, for turning it about its pivot, a worm gear is combined with the shiftable clutch which worm gear is devoid of any self-locking action. By virtue of this arrangement the trough is free to oscillate about its pivot to any extent in either direction, when the clutch is disconnected, which results in a peculiar kneading operation of the machine to the effect that the dough is thrown to and fro between the two implements in a manner similar to that of a highly qualified baker kneading dough by hand.

This highly desirable result, which was endeavored to be carried into effect mechanically by many builders of kneading machines from the very beginning of this art, was hitherto attained in but a very unsatisfactory degree by means of various proposals. Attempts that were made in this respect with machines having, for example, two kneaders moving up and down and towards the middle of a rotating trough had only the effect of airing and drawing the dough in the manner of a baker, but throwing the dough about between the two kneaders similarly as a baker throws the dough back into the trough in kneading by hand has not yet been accomplished by any known mechanism.

The operation of a machine according to this invention in which provision is made for the trough to oscillate freely about its pivot, however, realizes a method which consists in positively maintaining a rotational movement between a confined circular mass of material to be kneaded and co-acting working implements operating to seize successively portions of said mass at different pairs of oppositely disposed circumferential points of variable angular dispositions relatively to said mass and raising said portions seized at a time towards the central zone of the mass to be intermingled thereat by approaching on one another along arcuate paths that intersect at said zone only during the period of initiating the dough formation in the mass up to a required extent.

Thus, also with this embodiment of the invention the amount of dough started with can be definitely worked in a high class manner and without waste losses by controlling the kneading operation by ordinary hand control means only, that is, the same control means, as referred to in connection with the first embodiment of the invention, for adjusting the depths to which the implements penetrate into the dough, and an additional simple clutch control means for initiating the final squirting action to be exerted on the dough.

In the accompanying drawings three forms of the invention are illustrated by way of example only, in which Fig. 1 shows a sectional front elevation of a machine for mixing, stirring and kneading dough comprising a stirrup-like tiltable mounting frame for the trough, Fig. 2 shows a plan view of Fig. 1.

Fig. 3 shows a broken out side elevation of Fig. 1,

Fig. 4 is a view of a detail of a lifting device,

Fig. 5 illustrates a front elevation of a modified machine for mixing, stirring and kneading dough wherein the trough instead of being tiltable is adapted to be wheeled out of the machine, Fig. 6 shows a plan view of Fig. 5, Fig. 7 shows a broken out side elevation of Fig. 5;

Fig. 8 depicts a sectional rear elevation of a further modification of the machine according to the invention with a wheelable trough, and Fig. 9 shows a plan view of Fig. 8.

In the form of the invention as per the Figs. 1 to 4, the machine is provided with a stirrup-like tiltable frame 1 for supporting the trough 2. The tiltable frame is rockably mounted on a supporting structure 3, so as to be adapted to be displaced into a tilting position as shown in chain dotted lines in Fig. 3, and has fixed to it a driving motor 4 having two main speeds, for example 1500 and 750 revolutions per minute respectively. The driving motor is operatively connected with a worm shaft 5 for actuating the trough through the medium of a speed reduction gear 6, combined for example with a belt drive 7. A worm 8 is loosely mounted on the shaft 5 and in the operative position frictionally engages by means of a terminal cone a complementary conical head of a friction clutch 9, so as to be adapted to drive the trough in the direction of arrow A by means of an intermeshed worm wheel 10 fixed to the trough. By disengaging the terminal cone of the worm 8 from the conical head of the friction clutch 9, with the aid of shifting means not shown, the trough can be disconnected.

In the vicinity of each of the two arms of the tiltable frame 1, the shaft 5 carries a bevel gear wheel 11 which meshes with a corresponding wheel 12 on one of two shafts 13 extending alongside of the arms of the tiltable frame. These shafts accommodate two pinions 14, so as to be longitudinally displaceable thereon but kept from rotation and each cooperating with a screw wheel 16 fixed on the adjacent one of the two operating shafts 15 for the implements 17 for acting on the material placed in the trough 2.

The working shafts 15 extend in their operative positions in a direction downwardly inclined from the edge of the trough in such a manner that their prolonged center lines intersect in the axis of rotation of the trough near the middle of the bottom thereof and that the implements 17 are situated in the trough in a diametrically opposite relation. The shafts 15 are mounted in casings 18 by means of ball bearings 15′, these casings being each displaceable by means of a projection 19 sliding in a longitudinal guide bore 20 of the adjacent arm of the stirrup-like tiltable frame 1 and secured against rotation by a spline 21 positioned in the respective bore (Fig. 4).

Rearwardly of the machine the projections 19 are provided with gear teeth which mesh with two pinions 24 mounted at both ends of a transmission shaft 23 belonging to a lifting device for the working implements and adapted to be turned by means of a hand wheel 22. On turning the hand wheel 22 in one or the other direction of rotation, the ring-shaped implements 17 can be displaced by means of the lifting device into any desired position of adjustment relatively to the trough, for cooperation therewith during the kneading operation. This displacement of the implements is limited by two end positions one of which is shown in full lines in Fig. 1, in which the implements sweep the inner wall of the trough along a considerable length of the common line of contact therewith, and the other of which is indicated in chain dotted lines in this figure. During the adjusting movements of the implements the pinions 14 slide on the shafts 13 due to being operatively connected with the casings 18.

For fixing the implements 17 and the projections 19 in their correlated guide bores of the arms of the stirrup respectively, clamp screws 25 are arranged at the upper ends of these arms. In the machine as shown and assumed to have a trough content of about 120 liters, a range of adjustment of the implements between the two end positions of approximately 90 to 120 millimeters suffices with any amount of material present in the trough, for permitting to retract the implements a requisite extent, on the dough formation being initiated in the material, in order to prevent the dough from rising up along the implements.

With the aid of the two main speeds of the driving motor 4 and the speed reduction gear 6, in the example shown, four different speeds can be obtained for turning the implements in opposite directions of rotation, as indicated by the arrows B and B'. It is, however, obvious that any desired number of working speeds for the implements may be provided.

Via pipe studs 26, 27, and corresponding passages 26', 27' in the interior of the pivot of the trough, with the aid of a water jacket 29 and small pipes 31 extending up into said jacket and communicating with the passages 26', 27' and an outlet 30 respectively, the trough can be alternately heated or cooled by a supply of hot water or steam or cold water respectively.

In the modified machine for mixing, stirring and kneading dough, as shown in the Figs. 5 to 7, a trough 2' which is not adapted to be tilted is employed and supported by a carriage 35 equipped with a handle provided guide bar 36. This guide bar permits of wheeling the trough in or out of the stirrup-like frame 37 of the machine. In the operative position of the trough inside the frame, which carries the driving motor 4, worm shaft 5, speed reduction clutch 6, belt drive 7 and worm 8 inclusive of the friction clutch 9, the trough is retained by a toggle lever mechanism so that the worm wheel 10 is in mesh with the worm 8 to be driven thereby in the direction of the arrow A.

The actuation of the implements 17 in opposite directions to each other, as indicated by the arrows B, B', is effected also here by means of shafts 13 extending alongside of the arms of the stirrup and operatively connected with the worm shaft 5 through the intermediary of screw wheels 39, 40. The shafts 13 are, however, prolonged upwardly to a considerable extent. This arrangement permits to lift the implements clear of the trough, when the material is worked completely, by means of the transmission shaft 23 situated at the upper ends of the stirrup arms and rotatable with the aid of the hand wheel 22 and engaging also here by means of pinions 24 with corresponding toothed portions of the projections 19 of the gear casings 18 for the operating shafts 15.

The lifting device thus serves a double purpose, in the first place for commonly retracting the implements from the trough bottom, when drawing out and kneading the dough is desired, and secondly for completely removing the implements from the trough, so as to permit the latter to be wheeled out of the machine for emptying the same. Accordingly, the pinions 14 meshing with the screw wheels 16 on the operating shafts are adapted to be displaced upwards on the shafts 13 a requisite extent. On the other hand the pinions can be shifted downwards on the shafts 13 so much that the implements 17 also here reach down to the bottom of the trough, and thus the same implements can be used for initiating the dough formation with the implements in lowermost position as well as for kneading and mixing the dough with the implements retracted from the bottom of the trough a relatively small amount, the same is described in connection with the preceding example of the machine.

In the third embodiment of the invention shown in Figs. 8 and 9, a machine of the type described immediately above, is provided with a drive gear for the trough wherein is included a friction clutch 9 the shiftable portion 9'' of which cooperates with a friction cone 9' which in turn is rigid with a worm 8 of special construction. The rise of the helical portions of the worm 8, which is loosely mounted on the shaft 5 between two shouldered members 41 and 42, is so chosen that the worm gear 8, 10 is devoid of any self-locking action, when the cone 9' is disconnected from the counter member 9''.

For shifting the member 9'' on the shaft 5 in or out of engagement with the cone 9', the member 9'', which is adapted to rotate together with the shaft 5, is operatively connected with a control lever mechanism. A bell crank lever 44 of this mechanism which is mounted in the machine frame 37 underneath the clutch member 9'', takes into an annular groove 43 in the latter by means of a forked arm. The other arm of the lever 44 is pivotally connected to a link 45 the opposite end of which engages, by means of a pivot joint, a control lever 46 rotatably mounted on a screw bolt 47. By rocking the lever 46 in one or the other direction, the clutch member 9'' is shifted to and fro on the shaft 5, so that in the connected condition of the clutch 9 the trough is rotated in the direction of arrow A in Fig. 9. On the other hand, when the clutch 9 is disconnected during the second period of working the dough, while the implements are retracted from the bottom of the trough, the latter is free to rock in any direction of rotation to any extent by the dough reacting thereon in accordance with the squirting effect exerted on the material by the kneading implements. In this way provision is made for a free play of the trough in adaptation to the forces acting in the dough during the treatment to which the material is subjected by the oppositely disposed implements, wherefrom a kneading operation ensues similar to that carried out by an expert baker by hand, the dough being thrown back and forth between the two implements. The result is that a high quality kneaded material is obtained.

It is obvious that the same result is obtained, if, instead of the means for retracting the implements from the trough bottom, means are provided to the converse effect of retracting the trough bottom from the implements.

I do not limit myself to the particular size, shape, number or arrangement of parts as shown and described, all of which may be varied without going beyond the scope of my invention as shown, described and claimed.

What I claim is:

1. In a machine for mixing and stirring materials and kneading the same, in combination, a machine frame, a rotatable trough received by the machine frame, a curved bottom on said trough, two oppositely rotatable beaters cooperating with said trough with their rotation axes diametrically opposed relative thereto and converging towards said trough bottom, said beaters having arms extending so as to intersect with their rotational paths in a central zone of said trough and to completely scrape said curved bottom along a common line of contact therewith, disconnectable driving means for said rotatable trough, means for spacing said beaters from said trough bottom in position to prevent the material rising along the beaters and being lost, and means for locking said spacing means in any position of adjustment thereof.

2. In a machine for mixing and stirring materials and kneading the same without waste losses by dissipation of the doughy mass rising up along the working implement, in combination, a machine frame, a rotatable trough received by the machine frame, a curved bottom on said trough, two oppositely rotatable beaters cooperating with said trough with their rotation axes diametrically opposed relative thereto and converging towards said trough bottom, beater arms extending so as to intersect with their rotational paths in a central zone of said trough and to completely scrape said curved bottom along a common line of contact therewith, disconnectable driving means for said rotatable trough, a hand operated lifting device for spacing said beaters from said trough bottom into position to obviate waste of material, and means for locking said lifting device in any position of adjustment thereof.

3. In a machine for mixing and stirring materials and kneading the same without waste losses by dissipation of the doughy mass rising up along the working implement, in combination, a machine frame, a rotatable trough received by the machine frame, a curved bottom on said trough, two oppositely rotatable beaters cooperating with said trough with their rotation axes diametrically opposed relative thereto and converging towards said trough bottom, beater arms extending so as to intersect with their rotational paths in a central zone of said trough and to completely scrape said curved bottom along a common line of contact therewith, driving means for said rotatable trough, a disconnectable clutch comprised by said driving means, a worm gear in said driving means controlled by said clutch, said gear having helical portions having a rise to prevent self-locking of said gear, means for spacing said beaters from said trough bottom into position to obviate waste of material, and means for locking said spacing means in any position of adjustment thereof, said worm gear being disconnected by said clutch while said spacing means is substantially adjusted into said waste obviating position, for permitting said trough to rock freely about its rotational axis to adapt the doughy mass to be thrown back and forth between said beaters.

4. In a machine for mixing and stirring materials and kneading the same without waste losses by dissipation of the doughy mass rising up along the working implement, in combination, a machine frame, a rotatable trough received by the machine frame, a curved bottom on said trough, two oppositely rotatable beaters cooperating with said trough with their rotation axes diametrically opposed relative thereto and converging towards said trough bottom, beater arms extending so as to intersect with their rotational paths in a central zone of said trough and to completely scrape said curved bottom along a common line of contact therewith, disconnectable driving means for said rotatable trough, means for spacing said beaters from said trough bottom into waste loss obviating position, and means for locking said spacing means in any position of adjustment thereof.

5. In a machine for mixing and stirring materials and kneading the same without waste losses by dissipation of the doughy mass rising up along the working implements, in combination, a stirrup-like tiltable frame having upwardly extending arms providing a yoke, a trough rotatably mounted in said yoke, a curved bottom on said trough, two oppositely rotatable beaters mounted in said frame separated by an open material inspection space on the exterior ends of said stirrup arms for cooperation with said trough with their axes diametrically opposed relative thereto and converging towards said trough bottom, beater arms extending so as to intersect with their rotational paths in a central zone of said trough and to completely scrape said curved bottom along a common line of contact therewith, disconnectable driving means for said rotatable trough, means for spacing said beaters from said trough bottom at least into waste loss obviating position, and means situated at said exterior ends of said stirrup arms for locking said spacing means in any position of adjustment thereof.

6. In a machine for mixing and stirring materials and kneading the same without waste losses by dissipation of the doughy mass rising up along the working implements, in combination, a stirrup-like tiltable frame having upwardly extending arms, a wheelable trough inserted in said frame, a curved bottom on said frame, two oppositely rotatable beaters mounted in said frame separated by an open material inspection space on the exterior ends of said stirrup arms for cooperation with said trough with their axes diametrically opposed relative thereto and converging towards said trough bottom, beater arms extending so as to intersect with their rotational paths in a central zone of said trough and to completely scrape said curved bottom along a common line of contact therewith, disconnectable driving means intercalated between said frame and said trough, a disconnectable clutch comprised by said driving means, said driving means including a worm gear controlled by said clutch, means for spacing said beaters from said trough bottom into waste obviating position, and means situated at said exterior ends of said stirrup arms for locking said spacing means in any position of adjustment, said worm gear being disconnected by said clutch while said spacing means is locked in waste obviating position, for permitting said trough to rock freely about its rotational axis to adapt the doughy mass to be thrown back and forth between said beaters.

7. In a method of mixing and stirring materials and kneading the same, the steps comprising, dipping oppositely rotating beaters into a circumferentially confined mass of materials to the bottom thereof, seizing portions of said mass at points on diametrically opposite sides of said circumference, raising said seized portions towards the central zone of said mass to be intermingled thereat along intercrossing paths, repeating this sequence of working operations successively at different pairs of diametrically opposed points disposed at variable relative angular ranges until said mass assumes a dough-like consistency, reducing the depth to which said beaters are dipped into said mass a certain amount, seizing said dough-like mass as an integral lump by said implements in turn, and throwing it back and forth between the latter.

FRIEDRICH AESCHBACH.